(No Model.)
F. E. CLARK.
FILE CASE.
No. 601,746.
Patented Apr. 5, 1898.
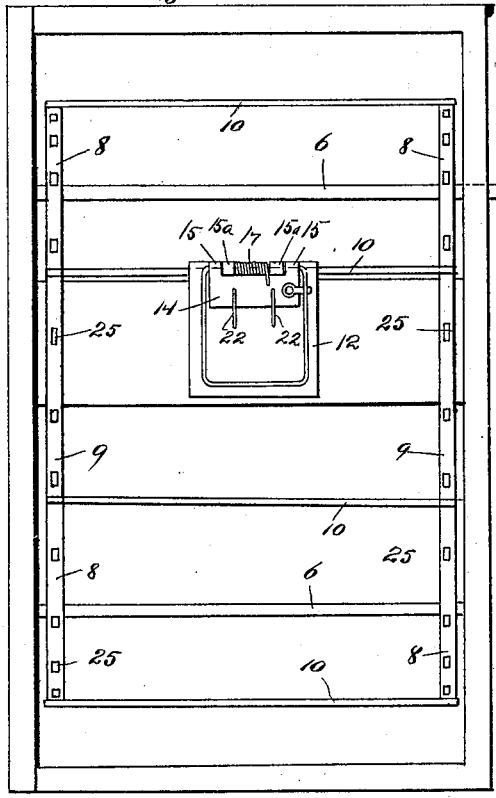
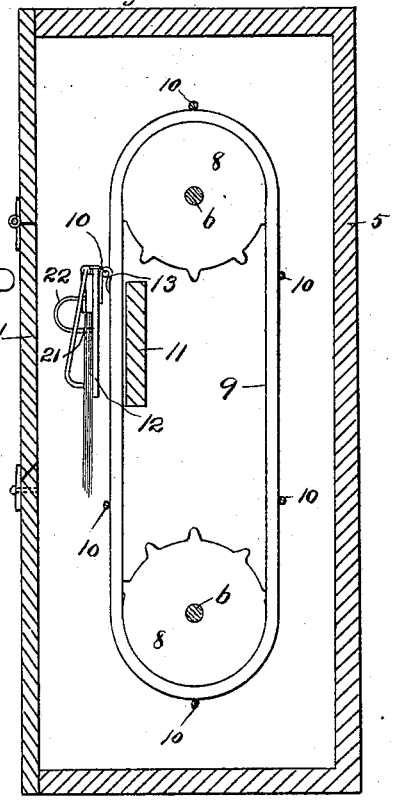
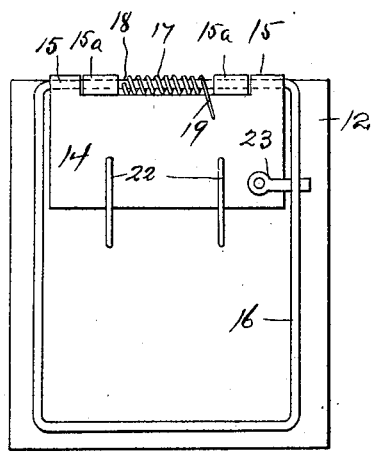
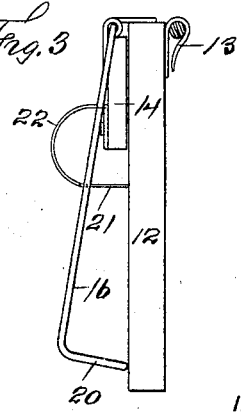
WITNESSES.
C. Nordfors
C. Gerst
INVENTOR
Frank E. Clark.
BY
Edgar Tate & Co.
ATTORNEYS.

UNITED STATES PATENT OFFICE.

FRANK E. CLARK, OF WEST BEND, IOWA, ASSIGNOR OF ONE-FOURTH TO M. W. DUDDY, OF SAME PLACE.

FILE-CASE.

SPECIFICATION forming part of Letters Patent No. 601,746, dated April 5, 1898.

Application filed July 13, 1897. Serial No. 644,391. (No model.)

*To all whom it may concern:*

Be it known that I, FRANK E. CLARK, a citizen of the United States, residing at West Bend, in the county of Palo Alto and State of Iowa, have invented certain new and useful Improvements in File-Cases, of which the following is a full and complete specification, such as will enable those skilled in the art to which it appertains to make and use the same.
This invention relates to file-cases; and the object thereof is to provide an improved device of this class which is simple in construction and operation and by means of which bills, letters, and other papers of various kinds and classes may be filed away in such manner as to be readily inspected at all times.

The invention is fully disclosed in the following specification, of which the accompanying drawings form a part, in which—
Figure 1 is a central longitudinal section of my improved file-case; Fig. 2, a side view thereof with one side of the casing removed; Fig. 3, a side view of a paper-file which I employ, and Fig. 4 a plan view thereof.
In the drawings forming part of this specification the separate parts of my improvement are designated by the same numerals of reference in each of the views, and in the practice of my invention I provide a rectangular casing 5, which may be composed of any desired material and in which are mounted two horizontal shafts 6, said shafts being arranged adjacent to each end of the casing, and one of said shafts projects through said casing and is provided with a crank 7, and mounted on each of said shafts within said casing are two sprocket-wheels 8. I also provide two carrying-belts 9, which are mounted on the sprocket-wheels 8, as shown in the drawings, and these carrying-belts are connected by transverse rods 10, any desired number of which may be employed, and mounted vertically of the casing 5, between the shafts 6, is a plate or board 11, over or outside of which the carrying-belts pass. I also provide a paper-file, consisting of a plate or board 12, to one end of which is secured at the back thereof hooks 13, which are adapted to engage with one of the rods 10, and to the same end of said plate but at the front side thereof is hinged a supplemental plate 14, which is provided with backwardly-directed jaws 15, and I also provide a clamp 16, which consists of a rectangular link, one side of which passes through the jaws 15 of the supplemental plate 14 and through corresponding jaws 15ª, formed on the plate or board 12, and said jaws and said side of said link constitute the hinge by which the supplemental plate or board 14 is connected with the plate or board 12, and wound on said link is a spring 17, one end of which is secured to said link, as shown at 18, and the opposite end of which bears upon the plate or board 14, as shown at 19.

The outer end of the clamp 16 is curved inwardly, as shown at 20 in Fig. 3, and the plate or board 12 is provided with pins 21, preferably tubular in form, which are adapted to receive the ends of yoke-shaped hooks 22, which are secured to the supplemental plate or board 14. The plate or board 14 is also provided with a pivoted catch 23, which is adapted to be turned into the position shown in Fig. 4, in which position the link-clamp 16 will bear thereon, and the operation will be readily understood from the foregoing description when taken in connection with the accompanying drawings and the following statement thereof.

The casing 5 is provided in front of the plate or board 11 with a hinged door 24, and in practice the files are connected with the rods 10 by means of the hooks 13, as shown in Fig. 1, and the papers are connected with said files, as is also shown in Fig. 1, and in this operation the spring-operative link-clamp 16 is turned outwardly, and the yoke-shaped hooks 22 are also turned and the papers are placed on the tubular pins 21 in the usual manner, and it will be apparent that one of these files may be connected with each of the rods 10; and my invention is not limited to the construction of the files herein shown and described, as any suitable files which are adapted to be connected with the rods 10 may be employed.

In examining the files or in placing papers or other documents thereon it is only necessary to open the door 24 of the casing and turn the carrying-belts by means of the crank 7, and this operation will carry said carrying-belts around on the sprocket-wheels 8, and the said files will successively appear in position in front of the plate or board 11.

The plate or board 11 constitutes a bearing-surface for the carrying-belts which is designed to support the latter in placing the files in position or in placing papers thereon, and said carrying-belts preferably consist of rubber straps provided with holes or openings 25, through which the sprockets or teeth of the sprocket-wheels pass; but said carrying-belts may be of any desired construction and may be composed of metal, if desired.

It will thus be seen that I accomplish the object of my invention by means of a device which is simple in construction and operation and which is perfectly adapted to produce the result for which it is intended.

Having fully described my invention, I claim as new and desire to secure by Letters Patent—

1. In a file-case, an outer casing, sprockets mounted therein, endless bands traversing the sprockets, rods connected respectively with said endless bands, and means for rotating said bands, in combination with a letter-file, comprising a back plate, means for retaining documents thereon, and hooks whereby said plate may be attached to said rods, substantially as shown and described.

2. In a file-case, the combination with an outer casing, sprockets mounted therein, endless bands traversing said sprockets, rods connected respectively with said bands, and bearing-surfaces for said endless carriers, of a file consisting substantially of a back plate, means for retaining documents thereon, and hooks whereby said plate is movably attached to said rod, substantially as shown and described.

3. In a file-case, the combination with an outer casing, sprockets mounted therein, endless bands traversing said sprockets, rods connected respectively with said bands, and bearing-surfaces for said endless carriers, of a file consisting substantially of a back plate, means for retaining documents thereon, and hooks whereby said plate is removably attached to said rod, said outer casing being provided with means of access to said file, substantially as shown and described.

4. In a file-case, the combination with an outer casing, sprockets mounted therein, endless bands traversing said sprockets, rods connected respectively with said bands, and bearing-surfaces for said endless carriers, of a file consisting substantially of a back plate, and hooks whereby said plate is removably attached to said rod, said outer casing being provided with means of access to said file, a supplemental plate hinged to said back plate, having a catch pivoted thereto, and a spring-actuated retaining-clasp, substantially as shown and described.

In testimony that I claim the foregoing as my invention I have signed my name, in presence of the subscribing witnesses, this 8th day of July, 1897.

FRANK E. CLARK.

Witnesses:
C. O. IHMELS,
J. A. BARRETT.

Correction in Letters Patent No. 601,746.

It is hereby certified that in Letters Patent No. 601,746, granted April 5, 1898, upon the application of Frank E. Clark, of West Bend, Iowa, for an improvement in "File-Cases," was erronously issued to said Frank E. Clark, inventor, and M. W. Duddy, as assignee of one-fourth interest in said invention; whereas the patent should have been granted to said *Frank E. Clark*, he being sole owner of the entire interest; and that the said Letters Patent should be read with this correction therein that the same may conform to the record of the case in the Patent Office.

Signed, countersigned, and sealed this 26th day of April, A. D., 1898.

[SEAL.]
                WEBSTER DAVIS,
                *Assistant Secretary of the Interior.*

Countersigned:
 C. H. DUELL,
  *Commissioner of Patents.*